United States Patent
Yu et al.

(10) Patent No.: US 11,924,783 B2
(45) Date of Patent: *Mar. 5, 2024

(54) APPARATUSES AND METHODS FOR CONTROLLING EXPOSURE TO WIRELESS COMMUNICATION

(71) Applicant: Samsung Electronics Co., Ltd., Suwon-si (KR)

(72) Inventors: Hyunseok Yu, Suwon-si (KR); Daeyoung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 46 days.

This patent is subject to a terminal disclaimer.

(21) Appl. No.: 17/412,544

(22) Filed: Aug. 26, 2021

(65) Prior Publication Data

US 2021/0385763 A1    Dec. 9, 2021

Related U.S. Application Data

(63) Continuation of application No. 16/582,676, filed on Sep. 25, 2019, now Pat. No. 11,129,115.

(30) Foreign Application Priority Data

Nov. 27, 2018    (KR) .......................... 10-2018-0148762
Apr. 9, 2019    (KR) .......................... 10-2019-0041493

(51) Int. Cl.
*H04W 24/08*    (2009.01)
*H04B 7/0404*    (2017.01)
(Continued)

(52) U.S. Cl.
CPC .......... *H04W 52/38* (2013.01); *H04B 7/0404* (2013.01); *H04W 24/08* (2013.01);
(Continued)

(58) Field of Classification Search
CPC . H04W 52/38; H04W 24/08; H04W 72/0453; H04W 72/085; H04W 76/15; H04B 7/0404

See application file for complete search history.

(56) References Cited

U.S. PATENT DOCUMENTS 8,306,496 B2    11/2012    Shoji et al.
8,532,211 B2    9/2013    Filipovic et al.
(Continued)

FOREIGN PATENT DOCUMENTS

CN        102484521 A    5/2012
CN        105165110 A    12/2015
(Continued)

OTHER PUBLICATIONS

TW office action dated Oct. 24, 2022 for corresponding TW Patent Application No. 108140871.
(Continued)

*Primary Examiner* — Rasheed Gidado
(74) *Attorney, Agent, or Firm* — Harness, Dickey & Pierce, P.L.C.

(57)    ABSTRACT

A signal processing apparatus for controlling exposure to wireless communication includes processing circuitry configured to control transmission through a first antenna module based on a reflection coefficient of a second antenna module, the first antenna module configured for wireless communication in a first frequency band, the second antenna module configured for wireless communication in a second frequency band, the second frequency band being a lower frequency band than the first frequency band.

20 Claims, 11 Drawing Sheets

(51) Int. Cl.
  *H04W 52/38* (2009.01)
  *H04W 72/04* (2023.01)
  *H04W 72/0453* (2023.01)
  *H04W 72/08* (2009.01)
  *H04W 72/542* (2023.01)
  *H04W 76/15* (2018.01)
(52) U.S. Cl.
  CPC ..... *H04W 72/0453* (2013.01); *H04W 72/542* (2023.01); *H04W 76/15* (2018.02)

(56) References Cited

U.S. PATENT DOCUMENTS

| | | | |
|---|---|---|---|
| 8,825,102 | B2 | 9/2014 | Chakraborty et al. |
| 8,897,181 | B2 | 11/2014 | Wang et al. |
| 9,191,829 | B2 | 11/2015 | Maguire |
| 9,357,338 | B2 | 5/2016 | Iida |
| 9,391,428 | B2 | 7/2016 | Koyama et al. |
| 9,871,291 | B2 | 1/2018 | Chen et al. |
| 9,910,109 | B2 | 3/2018 | Thielens et al. |
| 10,727,958 | B2 | 7/2020 | Kim et al. |
| 2010/0013726 | A1* | 1/2010 | Matthews .............. H01Q 19/06 343/893 |
| 2010/0130151 | A1 | 5/2010 | Shoji et al. |
| 2010/0210240 | A1* | 8/2010 | Mahaffey ............ H04W 12/126 455/411 |
| 2011/0116404 | A1 | 5/2011 | Shimizu |
| 2011/0317595 | A1* | 12/2011 | Kanda .................. H04W 16/28 370/277 |
| 2012/0243579 | A1 | 9/2012 | Premakanthan et al. |
| 2012/0302183 | A1* | 11/2012 | Pescod ................. H01Q 1/273 343/718 |
| 2013/0157598 | A1 | 6/2013 | Rozenblit et al. |
| 2014/0233661 | A1 | 8/2014 | Campos et al. |
| 2014/0233666 | A1* | 8/2014 | Campos .............. H04B 7/0617 375/267 |
| 2015/0072632 | A1 | 3/2015 | Pourkhaatoun et al. |
| 2015/0236811 | A1 | 8/2015 | Akita et al. |
| 2017/0184699 | A1* | 6/2017 | Honma ................ G01S 13/003 |
| 2018/0020413 | A1 | 1/2018 | Kim et al. |
| 2018/0102593 | A1* | 4/2018 | Gong .................... H01Q 21/064 |
| 2018/0217247 | A1* | 8/2018 | Knutson ................. H04W 4/80 |
| 2018/0287259 | A1 | 10/2018 | Svendsen et al. |
| 2018/0287651 | A1 | 10/2018 | Fernando et al. |
| 2018/0331704 | A1 | 11/2018 | Xie |
| 2019/0089419 | A1* | 3/2019 | Kim ....................... H01Q 21/28 |
| 2019/0109387 | A1 | 4/2019 | Samadi Taheri et al. |
| 2019/0140363 | A1* | 5/2019 | Otsubo .................. H01Q 21/00 |
| 2019/0165450 | A1 | 5/2019 | Ji et al. |
| 2020/0015171 | A1* | 1/2020 | Nadakuduti ........ H04W 52/225 |
| 2020/0112926 | A1* | 4/2020 | Laghate ............... H04B 7/0404 |
| 2020/0280126 | A1* | 9/2020 | Wakabayashi ......... H01Q 1/242 |
| 2020/0412022 | A1* | 12/2020 | Yun ........................ H01Q 1/243 |

FOREIGN PATENT DOCUMENTS

| | | |
|---|---|---|
| CN | 106712794 A | 5/2017 |
| CN | 106877914 A | 6/2017 |
| JP | 2013074361 A | 4/2013 |
| KR | 10-2004-0027161 A | 4/2004 |
| KR | 10-2005-0080676 A | 8/2005 |
| KR | 101451268 B1 | 10/2014 |
| KR | 10-2018-0008232 A | 1/2018 |
| KR | 10-2018-0044081 A | 5/2018 |
| WO | WO-2012100480 A1 | 8/2012 |
| WO | WO-2012143936 A1 | 10/2012 |
| WO | WO-2013176786 A1 | 11/2013 |
| WO | WO-2014120154 A1 | 8/2014 |
| WO | WO-2014154038 A1 | 10/2014 |

OTHER PUBLICATIONS

Non-Final Office Action dated Jan. 13, 2021, for corresponding U.S. Appl. No. 16/582,676.
Notice of Allowance dated May 17, 2021, for corresponding U.S. Appl. No. 16/582,676.
"Anchidin et al., Reflection Coefficient Measurements in the L-Band with Low Directivity Antennas in a Multipath Site, Sep. 2018, IEEE, pp. 1-3".
Indian office action dated Jan. 10, 2023 for corresponding IN Patent Application No. 201934047910.
Korean Office Action dated Aug. 21, 2023 for corresponding KR Patent Application No. 10-2019-0041493.
Chinese Office Action dated Oct. 31, 2023 for corresponding CN Patent Application No. 201911052881.0.

* cited by examiner

APPARATUSES AND METHODS FOR CONTROLLING EXPOSURE TO WIRELESS COMMUNICATION

CROSS-REFERENCE TO RELATED APPLICATIONS

This application is a continuation application of U.S. application Ser. No. 16/582,676, filed on Sep. 25, 2019, which claims priority to Korean Patent Application Nos. 10-2018-0148762 and 10-2019-0041493, respectively filed on Nov. 27, 2018 and Apr. 9, 2019, in the Korean Intellectual Property Office, the disclosures of which are incorporated herein in their entirety by reference.

BACKGROUND

The inventive concepts relates to wireless communication, and more particularly, to an apparatus and method for controlling a user's exposure to electromagnetic waves used for wireless communication.

Signal transmission in a wireless communication system may be susceptible to path loss, shadow fading, etc., and thus, high transmission power may be used to prevent or reduce the degradation of the quality of service (QoS) of wireless communication. Particularly, in the case of wireless communication using a signal of a high frequency band which is easily attenuated, such as a millimeter wave (mmWave) band, high transmission power may be used. However, as the transmission power increases, heat generation in a wireless communication device may increase. Also, as the transmission power increases, electromagnetic waves having high density may be generated during transmission. Therefore, it may be desirable to reduce the energy absorbed by a user of a wireless communication device, e.g., a terminal, due to the electromagnetic waves.

SUMMARY

The inventive concepts provide a method and apparatus for effectively reducing a user's exposure to electromagnetic waves while maintaining the quality of wireless communication.

According to an aspect of the inventive concepts, there is provided a signal processing apparatus for controlling exposure to wireless communication, the signal processing apparatus including processing circuitry configured to control transmission through a first antenna module based on a reflection coefficient of a second antenna module, the first antenna module configured for wireless communication in a first frequency band, the second antenna module configured for wireless communication in a second frequency band, the second frequency band being a lower frequency band than the first frequency band.

According to an aspect of the inventive concepts, there is provided a signal processing apparatus for controlling exposure to wireless communication, the signal processing apparatus including processing circuitry configured to receive a plurality of power levels from a plurality of first antenna modules, the plurality of first antenna modules configured for wireless communication in a first frequency band, each respective first antenna module among the plurality of first antenna modules including a respective antenna and a respective power sensor configured to detect a respective power level of a signal received via the respective antenna, the respective power level being one of the plurality of power levels, and reduce transmission power output through a low-power first antenna module among the plurality of first antenna modules when a difference between a lowest power level among the plurality of power levels and a second lowest power level among the plurality of power levels is greater than a first reference value, the low-power first antenna module corresponding to the lowest power level.

According to an aspect of the inventive concepts, there is provided a terminal capable of connected to multiple wireless communication systems, the terminal including a plurality of first antenna modules configured to connect to a first wireless communication system using a first frequency band, a plurality of second antenna modules configured to connect to a second wireless communication system using a second frequency band, the second frequency band being a lower frequency band than the first frequency band, and processing circuitry configured to calculate a plurality of calculated reflection coefficients of the plurality of second antenna modules, and control transmission through the plurality of first antenna modules based on the plurality of calculated reflection coefficients.

According to an aspect of the inventive concepts, there is provided a method of controlling exposure to millimeter wave (mmWave) wireless communication, the method including calculating a plurality of calculated reflection coefficients of a plurality of second antenna modules configured to connect to a low-band wireless communication system using a frequency band lower than a millimeter wave frequency band; estimating a plurality of estimated distances between an external object and a plurality of first antenna modules based on the plurality of calculated reflection coefficients, the plurality of first antenna modules configured to connect to a millimeter wave wireless communication system using millimeter waves; and controlling transmission through the plurality of first antenna modules based on the plurality of estimated distances.

BRIEF DESCRIPTION OF THE DRAWINGS

Embodiments of the inventive concepts will be more clearly understood from the following detailed description taken in conjunction with the accompanying drawings in which.

The drawings attached hereto may not be to scale for convenience of illustration and may be exaggerated or reduced in size.

DETAILED DESCRIPTION

Figure 1:
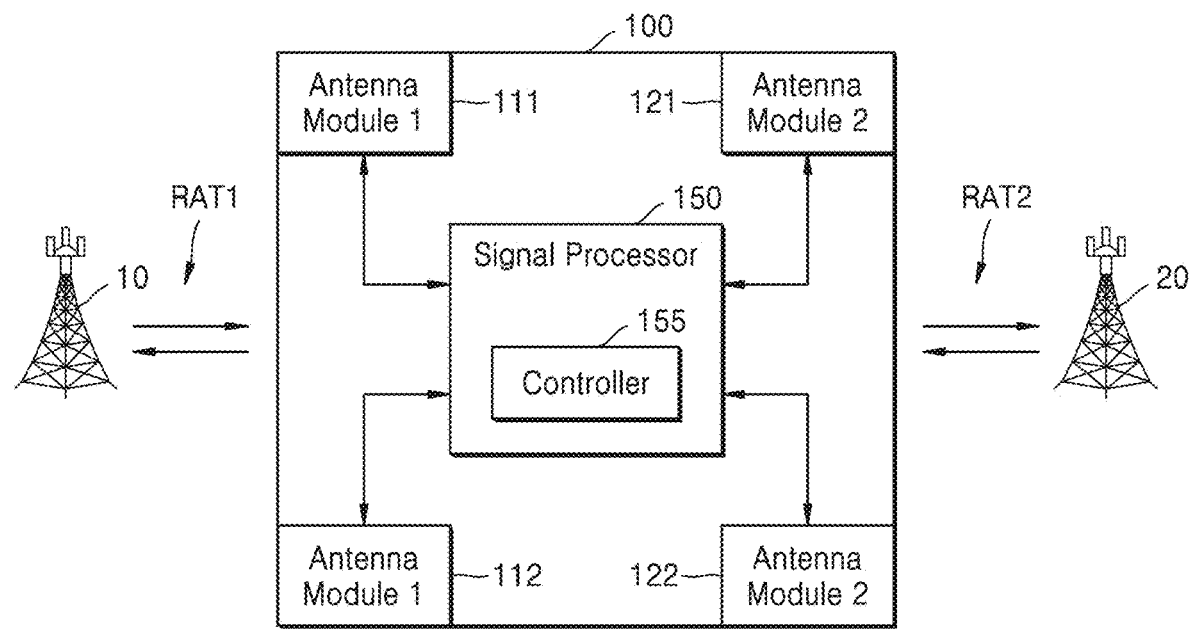
FIG. 1 is a block diagram showing wireless communication systems including a wireless communication device according to an embodiment of the inventive concepts.

FIG. 1 is a block diagram showing wireless communication systems including a wireless communication device according to an embodiment of the inventive concepts. In detail, FIG. 1 shows a user equipment (UE) 100 as a wireless communication device supporting multiple wireless communication systems like a first wireless communication system RAT1 and a second wireless communication system RAT2.

A wireless communication system may include, but is not limited to, a wireless communication system using a cellular network like a 5th generation (5G) wireless system, a long term evolution (LTE) system, an LTE-Advanced system, a code division multiple access (CDMA) system, a global system for mobile communications (GSM) system, a wireless local area network (WLAN) system, and/or any other wireless communication system. Hereinafter, a wireless communication system will be described with reference mainly to a wireless communication system using a cellular network, but it will be understood that example embodiments are not limited thereto.

The UE 100 may be connected to the first wireless communication system RAT1 and the second wireless communication system RAT2, which may be different from each other, and the first wireless communication system RAT1 may use a higher frequency band than the second wireless communication system RAT2. For example, the first wireless communication system RAT1 (e.g., a millimeter wave wireless communication system) may be a wireless communication system using millimeter waves (mmWave) (e.g., a 5G system), whereas the second wireless communication system RAT2 (e.g., a low-band wireless communication system) may be a wireless communication system using a frequency band lower than millimeter waves (mmWave) (e.g., an LTE system). The second wireless communication system RAT2 may also be referred to as a legacy wireless communication system. As shown in FIG. 1, the UE 100 may communicate with a first base station 10 in the first wireless communication system RAT1 and communicate with a second base station 20 in the second wireless communication system RAT2. In some embodiments, unlike that shown in FIG. 1, the UE 100 may communicate with one base station according to two or more different wireless communication systems (e.g., via the first wireless communication system RAT1 and the second wireless communication system RAT2). Also, in some embodiments, the UE 100 may support connections to three or more different wireless communication systems.

A base station (BS) like the first base station 10 and the second base station 20 may generally refer to a fixed station that communicates with a UE and/or other base stations and may exchange data and/or control information by communicating with the UEs and/or the other base stations. For example, a base station may be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, etc. In this specification, a base station or a cell may be understood as a comprehensive term indicating a portion and/or a function covered by a base station controller (BSC) in CDMA, a Node-B in WCDMA, an eNB in LTE, a gNB in 5G, and/or a sector (site) and may include various coverage areas like a megacell, a macrocell, a microcell, a picocell, a femtocell, an RRH, an RU, and/or a small cell communication range.

The UE 100 may refer to any equipment that is stationary or mobile and may communicate with a base station, e.g., the first base station 10 and/or the second base station 20, to transmit and/or receive data and/or control information. For example, the UE 100 may be referred to as a terminal, a terminal equipment, a mobile station (MS), a mobile terminal (MT), a user terminal (UT), a subscriber station, a wireless device, a handheld device, etc. Hereinafter, example embodiments will be described primarily with reference to the UE 100 as a wireless communication device, but it will be understood that example embodiments are not limited thereto.

A wireless communication network between the UE 100 and the first base station 10 or the second base station 20 may support communication between a plurality of users by sharing available network resources. For example, in a wireless communication network, information may be transmitted in various multiple connection schemes like code division multiple access (CDMA), frequency division multiple access (FDMA), time division multiple access (TDMA), orthogonal frequency division multiple access (OFDMA), single carrier frequency division multiple access (SC-FDMA), OFDM-FDMA, n OFDM-TDMA, and/or OFDM-CDMA. As shown in FIG. 1, the UE 100 may communicate with the first base station 10 and/or the second base station 20 via an uplink and/or a downlink. In some embodiments, UEs may communicate with each other through a sidelink, e.g., device-to-device (D2D). For example, the UE 100 may communicate with another UE through a sidelink.

The UE 100 may include a plurality of first antenna modules 111 and 112 and a plurality of second antenna modules 121 and 122 as shown in FIG. 1. Each of the first antenna modules 111 and 112 and the second antenna modules 121 and 122 may include at least one antenna and may process signals received via the antenna and/or signals to be transmitted through the antenna. For example, each of the first antenna modules 111 and 112 and the second antenna modules 121 and 122 may include a front-end radio frequency integrated circuit (RFIC) and, as described below with reference to FIG. 11, may include a power amplifier, a low-noise amplifier, a mixer, an RF switch, etc. The first antenna modules 111 and 112 may be used by the UE 100 to connect to the first wireless communication system RAT1, whereas the second antenna modules 121 and 122 may be used by the UE 100 to connect to the second wireless communication system RAT2. Furthermore, to enable communication with base stations, that is, the first base station 10 and/or the second base station 20, in spite of a transmission and/or reception interruption through some antenna modules due to an obstacle like a body part of a user and/or an orientation of the UE 100, the first antenna modules 111 and 112 and the second antenna modules 121 and 122 may be arranged apart from (e.g., external to and/or some distance away from) the UE 100. In some embodiments, unlike as shown in FIG. 1, the UE 100 may include three or more first antenna modules and may include three or more second antenna modules.

The UE 100 may include a signal processor 150. The signal processor 150 may communicate with the first antenna modules 111 and 112 and/or the second antenna modules 121 and 122. For example, the signal processor 150 may communicate with the first base station 10 through at least one of the first antenna modules 111 and 112 and/or may communicate with the second base station 20 through at least one of the second antenna modules 121 and 122. The signal processor 150 may be referred to as a signal processing apparatus, and, as shown in FIG. 1, the signal processor 150 may include a controller 155.

In a high frequency band like a millimeter wave (mm-Wave) band, a short-wavelength signal may have a strong straightness, which may be easily attenuated by an obstacle, and thus, a signal may provide a varying reception ratio depending on the orientation of an antenna. Therefore, in a wireless communication system using a high frequency band for increasing throughput, a transmitter may use high transmission power. For example, the first antenna modules 111 and 112 for connecting to the first wireless communication system RAT1 using a relatively high frequency band may use higher transmission power than the second antenna modules 121 and 122, and thus, a user of the UE 100 may be exposed to the electromagnetic waves generated by the first antenna modules 111 and 112. Metrics like a specific absorption rate (SAR) and/or a maximum permissible exposure (MPE) may be used to measure energy absorbed by a human body due to electromagnetic waves, and organizations like the Federal Communications and Commissions (FFC) of the United States of America define values that wireless communication devices comply with. Therefore, it may be desirable for the wireless communication device such as UE 100 to limit or reduce a user's exposure to electromagnetic waves while maintaining the quality of wireless communication with the base station, e.g., the first base station 10.

The controller 155 may estimate a relative location of an external object, e.g., a user, with respect to the UE 100 and may control transmission power of the first antenna modules 111 and 112 based on an estimated location, thereby controlling exposure of the user to electromagnetic waves. In some embodiments, the controller 155 may calculate reflection coefficients of the second antenna modules 121 and 122 included in the UE 100 for connecting to the second wireless communication system RAT2, which is a legacy wireless communication system, and estimate a relative location of an external object with respect to the UE 100 based on the reflection coefficients. In some embodiments, the controller 155 may obtain information regarding reception power from each of the first antenna modules 111 and 112 and estimate, based on the reception power, a relative location of an external object with respect to the UE 100. Furthermore, in some embodiments, the controller 155 may obtain a temperature from each of the first antenna modules 111 and 112 and may restrict transmission powers through the first antenna modules 111 and 112 based on temperatures. According to some example embodiments, operations described herein as being performed by the UE 100, the signal processor 150 and/or the controller 155 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, in some embodiments, the controller 155 may include a hardware logic block designed through logic synthesis or the like and may include a software block and at least one processing core for executing the software block.

Figure 2:
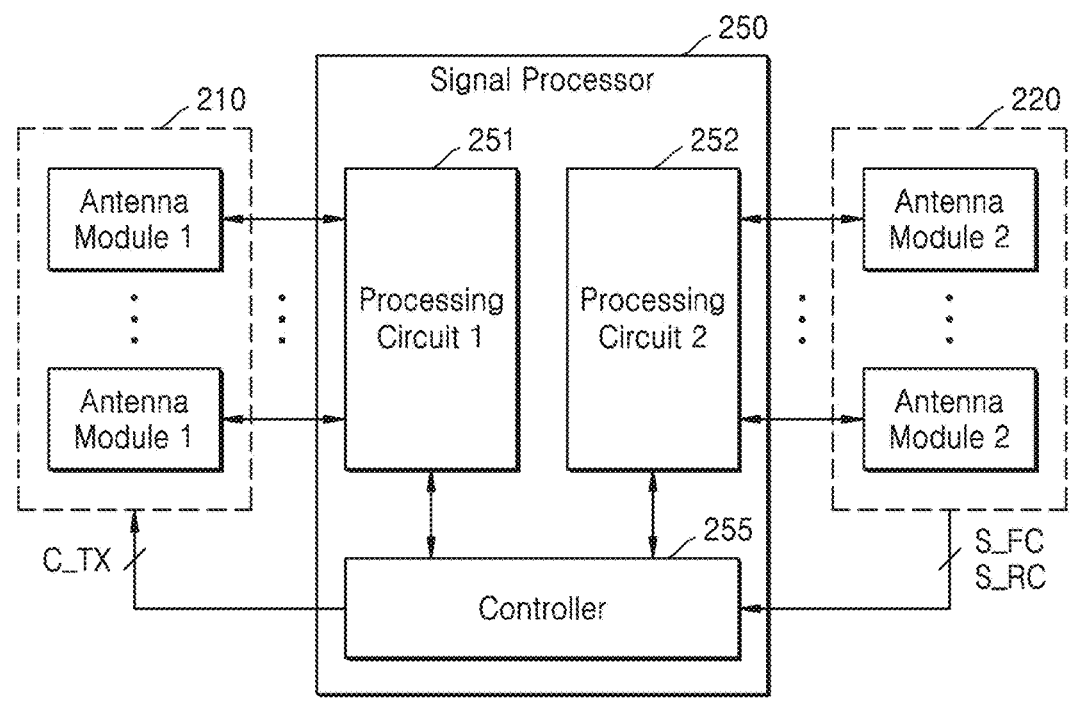
FIG. 2 is a block diagram showing a user equipment (UE) according to an embodiment of the inventive concepts.
Figure 3:
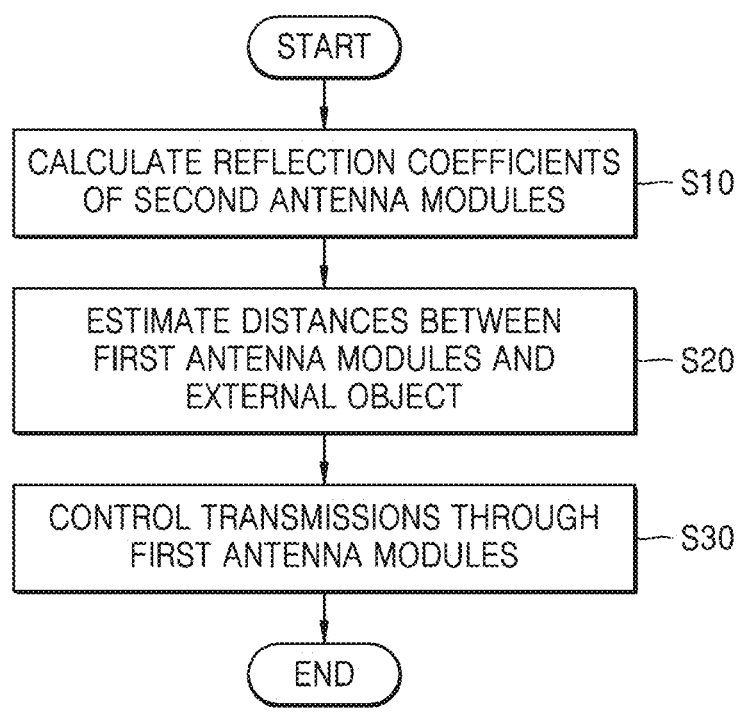
FIG. 3 is a flowchart of a method for controlling exposure to wireless communication, according to an embodiment of the inventive concepts.

FIG. 2 is a block diagram showing a UE 200 according to an embodiment of the inventive concepts, and FIG. 3 is a flowchart of a method of controlling exposure to wireless communication, according to an embodiment of the inventive concepts. In some embodiments, the method of FIG. 3 may be performed by an UE 200 (or a controller 255) of FIG. 2. Hereinafter, FIGS. 2 and 3 will be described with reference to FIG. 1.

Referring to FIG. 2, the UE 200 may include a plurality of first antenna modules 210, a plurality of second antenna modules 220, and/or a signal processor 250. As described above with reference to FIG. 1, the first antenna modules 210 may be used to connect to the first wireless communication system RAT1 using a relatively high frequency band, whereas the second antenna modules 220 may be used to connect to the second wireless communication system RAT2 using a relatively low frequency band. Hereinafter, it is assumed that the UE 200 includes N first antenna modules and M second antenna modules (M and N are integers greater than 1).

The signal processor 250 may include a first processing circuit 251, a second processing circuit 252, and/or the controller 255, as shown in FIG. 2. The first processing circuit 251 may communicate with the first antenna modules 210, and/or the second processing circuit 252 may communicate with the second antenna modules 220. According to some example embodiments, operations described herein as being performed by the UE 200, the signal processor 250, the first processing circuit 251, the second processing circuit 252 and/or the controller 255 may be performed by processing circuitry. For example, the first processing circuit 251 and the second processing circuit 252 may be referred to as RFICs and/or back-end RFICs and may communicate with the first antenna modules 210 and the second antenna modules 220 via signals in an RF band or an intermediate frequency (IF) band. Also, the first processing circuit 251 and the second processing circuit 252 may each include a mixer, a filter, an amplifier, and/or the like. The controller 255 may receive forward coupling signals S_FC and/or reverse coupling signals S_RC from the second antenna modules 220 and generate a control signal C_TX for controlling transmission powers through the first antenna modules 210.

Referring to FIG. 3, an operation for calculating reflection coefficients of the second antenna modules 220 may be performed in operation S10. For example, the controller 255 may calculate reflection coefficients of antennas included in the second antenna modules 220 based on the forward coupling signals S_FC and the reverse coupling signals S_RC received from the second antenna modules 220. In the present specification, the reflection coefficient (or impedance) of an antenna may be referred to as the reflection coefficient (or impedance) of an antenna module including the corresponding antenna. As described below with reference to FIG. 6, the second antenna modules 220 may include bidirectional couplers and the bidirectional couplers may provide the forward coupling signals S_FC to the controller 255 by coupling signals provided from the second processing circuit 252 to the second antenna modules 220. Also, the bidirectional couplers may provide the reverse coupling signals S_RC to the controller 255 by coupling signals reflected and returned from antennas included in the second antenna modules 220. The controller 255 may calculate impedances of current antennas from pairs of the forward coupling signals S_FC and the reverse coupling signals S_RC corresponding to each other and calculated impedances of the antennas may be used for antenna impedance tuning (AIT). For example, a reflection coefficient Γ may be calculated as shown in Equation 1 below.

$$\Gamma = \frac{|r_{rev}|}{|r_{fwd}|} \cdot \exp(j(\angle r_{rev} - \angle r_{fwd})) \quad \text{[Equation 1]}$$

In Equation 1, $r_{fwd}$ denotes a signal obtained through forward coupling and $r_{rev}$ denotes a signal obtained through reverse coupling. The controller 255 may calculate reflection coefficients of current antennas based on current impedances of the antennas and a designed impedance of the antennas. In some embodiments, the reflection coefficient of an antenna may be calculated based on a standing wave (SW) ratio. According to some example embodiments, the designed impedance of the antennas may refer to a design parameter determined through empirical study.

In operation S20, an operation for estimating distances between the first antenna modules 210 and an external object may be performed. As described above with reference to FIG. 1, the second antenna modules 220 may be arranged apart from the UE 200 and, as described below with reference to FIGS. 4 and 5, the reflection coefficients of antennas included in the second antenna modules 220 may vary depending on relative locations of an external object with respect to the UE 200. Therefore, the controller 255 may detect a relative position of an external object with respect to the UE 200 based on patterns of the reflection coefficients of the second antenna modules 220 which are calculated in operation S10 and estimate distances between the first antenna modules 210 and the external object. An example of operation S20 will be described below with reference to FIGS. 6 and 7.

In operation S30, an operation for controlling transmissions through the first antenna modules 210 may be performed. For example, the controller 255 may control transmissions through the first antenna modules 210 based on distances estimated in operation S20. For example, the controller 255 may reduce transmission power through a first antenna module, which is estimated to be close to the external object, from among the first antenna modules 210. The controller 255 may increase transmission power through a first antenna module, which is estimated to be far from the external object, from among the first antenna modules 210. Accordingly, exposure of an external object, e.g., a user, to electromagnetic waves may be reduced without deteriorating the quality of wireless communication. An example of operation S30 will be described below with reference to FIG. 9.

Figure 4:
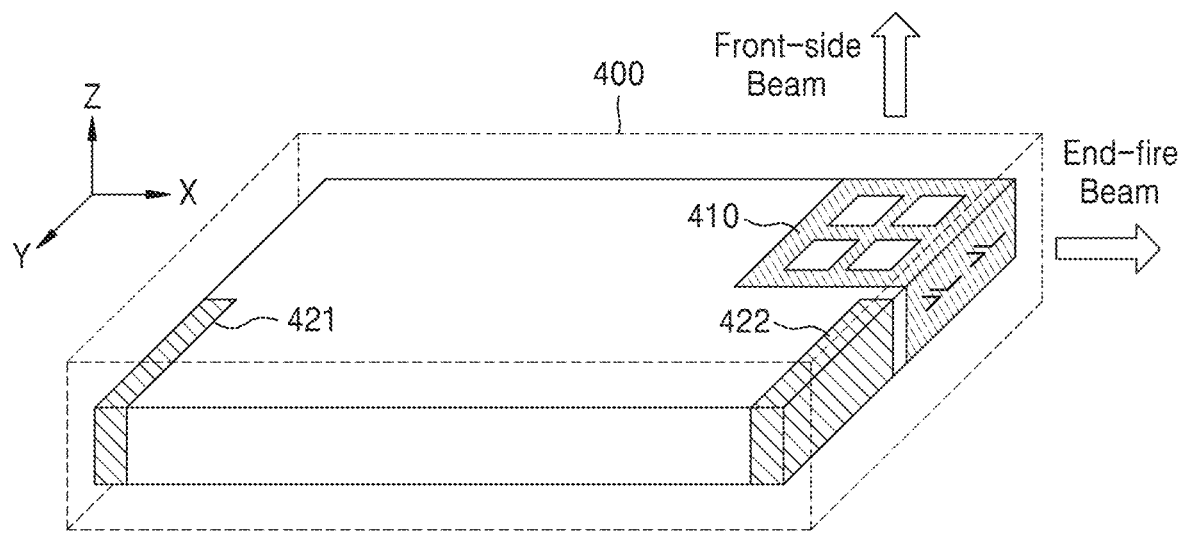
FIG. 4 is a schematic perspective view of a UE according to an embodiment of the inventive concepts.
Figure 5:
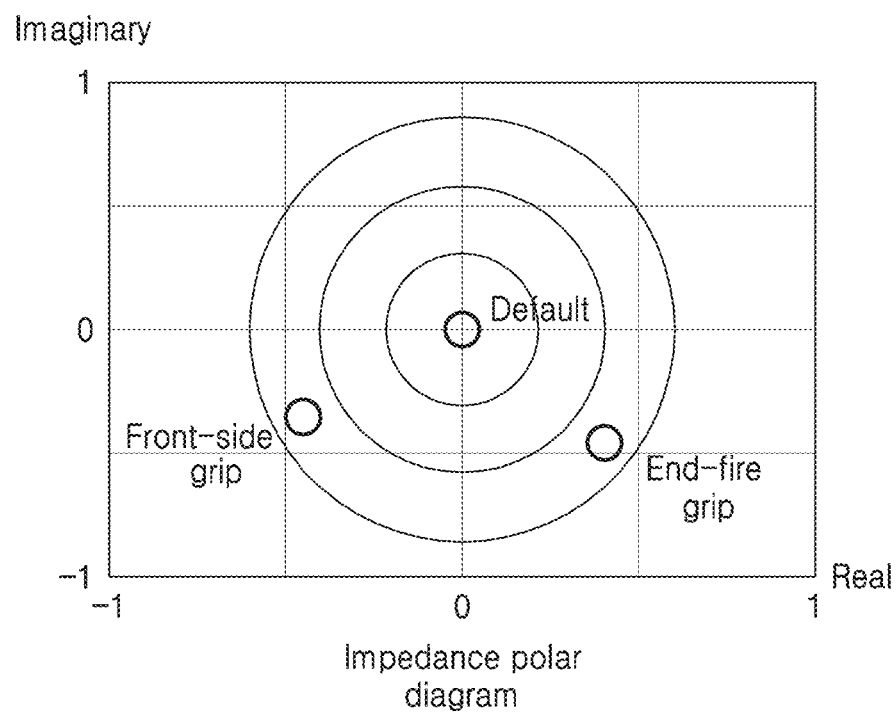
FIG. 5 is a graph showing examples of reflection coefficients of a second antenna module according to an embodiment of the inventive concepts.

FIG. 4 is a perspective view schematically showing a UE 400 according to an embodiment of the inventive concepts, and FIG. 5 is a graph showing examples of reflection coefficients of second antenna modules according to an embodiment of the inventive concepts.

Referring to FIG. 4, the UE 400 may include a first antenna module 410. The first antenna module 410 may transmit and/or receive signals of a high frequency band like a millimeter wave (mmWave) band and, as shown in FIG. 4, may include at least one patch antenna that may form a beam (e.g., a front-side beam) toward a front surface of the UE 400, that is, a surface perpendicular to the Z-axis and/or at least one dipole antenna that may form a beam (e.g., an end-fire beam) toward a side surface of the UE 400, that is, a surface perpendicular to the X-axis. Although only one first antenna module 410 is shown in FIG. 4 for convenience of illustration, the UE 400 may include a plurality of first antenna modules, as described above with reference to the drawings.

The UE 400 may include a plurality of second antenna modules 421 and 422. As shown in FIG. 4, the second antenna module 421 including a primary antenna may be disposed at one end of the UE 400, that is, at one end in the −X axis direction, whereas the second antenna module 422 including a diversity antenna may be disposed at another end, that is, at one end in the +X axis direction.

Referring to FIG. 5, when there is no external object proximate to the second antenna module 422, the impedance of the second antenna module 422 may be a design impedance, e.g., 50Ω, and thus, the reflection coefficient of the second antenna module 422 may correspond to the center point in the polar coordinates of FIG. 5. On the other hand, when an external object is located close to the front surface of the UE 400, the reflection coefficient of the second antenna module 422 may move to the lower left in the polar coordinates (e.g., the impedance polar diagram) of FIG. 5. Also, when an external object is located close to a side surface of the UE 400, the reflection coefficient of the second antenna module 422 may move to the lower right in the polar coordinates of FIG. 5. In this regard, the reflection coefficients of the plurality of second antenna modules 421 and 422 may vary according to relative locations of the external object with respect to the UE 400, and thus, the location of the external object may be estimated. FIG. 5 shows an example where the reflection coefficient varies and it will be appreciated that, in some embodiments, the reflection coefficient may vary differently from the manner shown in FIG. 5 depending on locations of the external object.

Figure 6:
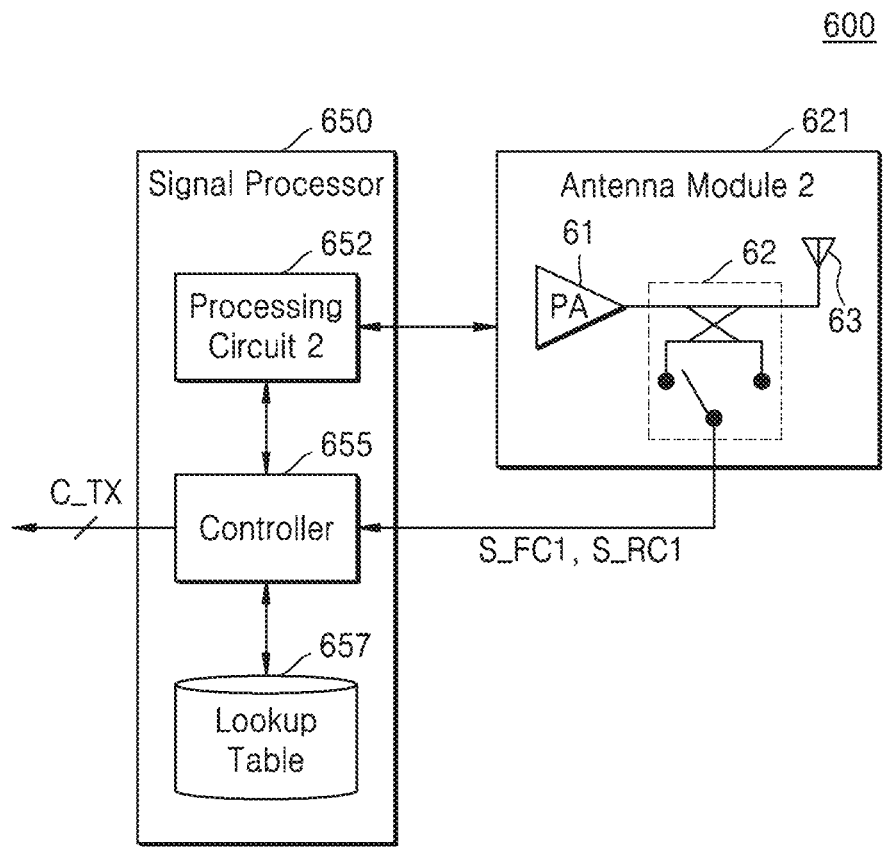
FIG. 6 is a block diagram showing a UE including a lookup table, according to an embodiment of the inventive concepts.

FIG. 6 is a block diagram showing a UE 600 according to an embodiment of the inventive concepts. Specifically, FIG. 6 shows a signal processor 650 as an example of the signal processor 250 of FIG. 2 and a second antenna module 621 as an example of one of a plurality of second antenna modules. Hereinafter, description identical or similar to that given above with reference to FIG. 2 will be omitted.

Referring to FIG. 6, the signal processor 650 may include a second processing circuit 652, a controller 655, and/or a look-up table 657. The second processing circuit 652 may communicate with the second antenna module 621. The controller 655 may receive a forward coupling signal S_FC1 and a reverse coupling signal S_RC1 from the second antenna module 621 and generate a control signal C_TX for controlling transmission powers through a plurality of first antenna modules (e.g., 210 of FIG. 2) with reference to information stored in the look-up table 657. For example, the controller 655 may determine a plurality of calculated reflection coefficients of the plurality of second antenna modules, obtain a plurality of obtained distances to the external object based on the calculated reflection coefficients by referencing the information stored in the look-up table 657 (e.g., by determining a plurality of distances associated with the combination represented by the calculated reflection coefficients), and generate the control signal C_TX based on the obtained distances to the external object. According to some example embodiments, operations described herein as being performed by the UE 600, the signal processor 650, the second processing circuit 652 and/or the controller 655 may be performed by processing circuitry.

The second antenna module 621 may include a power amplifier (PA) 61, a coupler 62, and/or an antenna 63. The coupler 62 includes (e.g., may be) a bidirectional coupler and, during a transmission period, may provide the forward coupling signal S_FC1 to the controller 655 by forward coupling, that is, by coupling (e.g., outputting) signals transmitted from the power amplifier 61 to the antenna 63 and provide the reverse coupling signal S_RC1 to the controller 655 by reverse coupling, that is, coupling (e.g., outputting) signals reflected by the antenna 63. In some embodiments, the coupler 62 may be included in the second antenna module 621 for (e.g., may be used for) tuning the impedance of the antenna 63 and, as described above with reference to the drawings, the coupler 62 may be used by the controller 655 to detect a relative location of an external object with respect to the UE 600. Therefore, without additional components like a proximity sensor, a gyro sensor, a touch sensor, etc., a distance between the UE 600 and an external object may be estimated, and thus, the UE 600 may exhibit low cost and/or high space efficiency.

The look-up table 657 may include combinations of reflection coefficients (e.g., reference reflection coefficients) of a plurality of second antenna modules including the second antenna module 621 and information regarding locations of an external object corresponding to the respective combinations (e.g., reference distances). Therefore, the controller 655 may access the look-up table 657 and detect a location of an external object corresponding to reflection coefficients calculated based on forward coupling signals (e.g., S_FC of FIG. 2) including the forward coupling signal S_FC1 and reverse coupling signals (e.g., S_RC of FIG. 2) including the reverse coupling signal S_RC1. The look-up table 657 may include a memory (e.g., may be stored in a memory, and/or may constitute a memory and/or data structure), and information (e.g., the information included in the look-up table 657) may be stored in the memory when the UE 600 and/or the signal processor 650 are manufactured. For example, the look-up table 657 may include a non-volatile memory and may include, but is not limited to, electrically erasable programmable read-only memory (EEPROM), a flash memory, phase change random access memory (PRAM), resistance random access memory (RRAM), nano floating gate memory (NFGM), polymer random access memory (PoRAM), magnetic random access memory (MRAM), and/or ferroelectric random access memory (FRAM). An example of the look-up table 657 will be described below with reference to FIG. 7.

Figure 7:
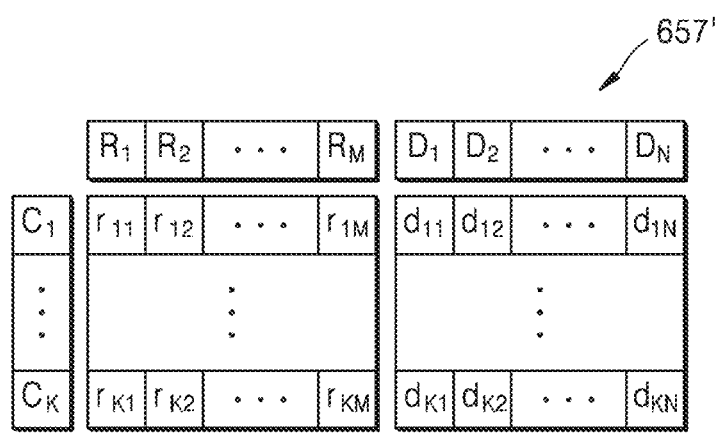
FIG. 7 is a diagram showing an example of a look-up table included in a UE according to an embodiment of the inventive concepts.

FIG. 7 is a diagram showing an example of a look-up table included in a UE according to an embodiment of the inventive concepts. In detail, a look-up table 657' of FIG. 7 may be an example of the look-up table 657 of FIG. 6. As described above with reference to FIG. 6, the look-up table 657' may include combinations of reflection coefficients of a plurality of second antenna modules and information regarding locations of an external target corresponding to the respective combinations. Hereinafter, FIG. 7 will be described with reference to FIG. 6.

In some embodiments, the look-up table 657' may include distances (e.g., reference distances) between a plurality of first antenna modules (e.g., the plurality of first antenna modules 210) and the external object as locations of the external object respectively corresponding to the combinations of the reflection coefficients of the second antenna modules. For example, as shown in FIG. 7, the look-up table 657' may include K combinations $C_1$ to $C_K$ (K is an integer greater than 1) as combinations of values (e.g., $r_{11}$ to $r_{KM}$) of M reflection coefficients $R_1$ to $R_M$ (e.g., reference reflection coefficients) obtained from M second antenna modules (e.g., each of coefficients $R_1$ to $R_M$ may be obtained from a corresponding one of the M second antenna modules). In some embodiments, the values of reflection coefficients included in the look-up table 657' may indicate the range of the reflection coefficients (e.g., the complete range of possible and/or predicted reflection coefficients). Accordingly, the look-up table 657' includes combination values (e.g., $d_{11}$ to $d_{KN}$) of N distances $D_1$ to $D_N$ between N first antenna modules and the external object respectively corresponding to the K combinations $C_1$ to $C_K$ (e.g., each of distances $D_1$ to $D_N$ may represent a distance between the external object and a corresponding one of the N first antenna modules). In some embodiments, the values of distances included in the look-up table 657' may indicate the range of distances and may indicate a degree of being apart from the external object, e.g., very close, close, or remote.

Figure 8:
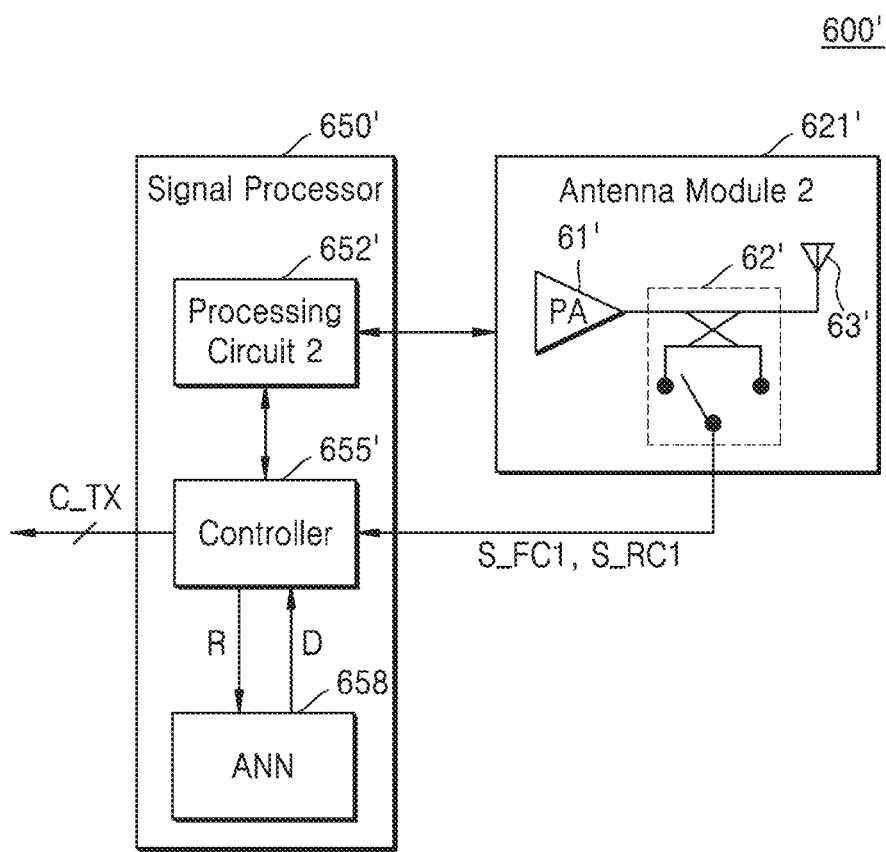
FIG. 8 is a block diagram showing a UE including an artificial neural network, according to an embodiment of the inventive concepts.

FIG. 8 is a block diagram showing a UE 600' according to an embodiment of the inventive concepts. Specifically, FIG. 8 shows a signal processor 650' as an example of the signal processor 650 of FIG. 6 and a second antenna module 621' as an example of one of a plurality of second antenna modules (e.g., the plurality of second antenna modules 220). Hereinafter, description identical or similar to that given above with reference to FIG. 6 will be omitted.

Referring to FIG. 8, the signal processor 650' may include a second processing circuit 652', a controller 655', and/or an artificial neural network (ANN) 658. Also, the second antenna module 621' may include a power amplifier 61', a coupler 62', and/or an antenna 63' and may provide the forward coupling signal S_FC1 and the reverse coupling signal S_RC1 to the controller 655'. Compared to the signal processor 650 of FIG. 6, the signal processor 650' of FIG. 8 may include the ANN 658 instead of the look-up table 657. According to some example embodiments, operations described herein as being performed by the UE 600', the signal processor 650', the second processing circuit 652', the controller 655' and/or the ANN 658 may be performed by processing circuitry. In some example embodiments, the processing circuitry may perform some operations (e.g., the operations described herein as being performed by the ANN 658) by artificial intelligence and/or machine learning. As an example, the processing circuitry may implement an artificial neural network (e.g., the ANN 658) that is trained on a set of training data by, for example, a supervised, unsupervised, and/or reinforcement learning model, and wherein the processing circuitry may process a feature vector to provide output based upon the training. Such artificial neural networks may utilize a variety of artificial neural network organizational and processing models, such as convolutional neural networks (CNN), recurrent neural networks (RNN) optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the processing circuitry may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The ANN 658 may receive reflection coefficients R of a plurality of second antenna modules including the second antenna module 621' from the controller 655' and output distances D between a plurality of first antenna modules (e.g., 210 of FIG. 2) and an external object in response to the reflection coefficients R. The ANN 658 may refer to a structure in which sets of artificial neurons (or neuron models) are mutually connected. An artificial neuron may generate output data by performing simple operations on input data, and the output data may be transferred to other artificial neurons. The ANN 658 may be trained with the reflection coefficients (e.g., reference reflection coefficients) of a plurality of second antenna modules (e.g., a plurality of reference second antenna modules), and thus, the ANN 658 may output the distances D in response to the reflection coefficients R provided by the controller 655'.

Figure 9:
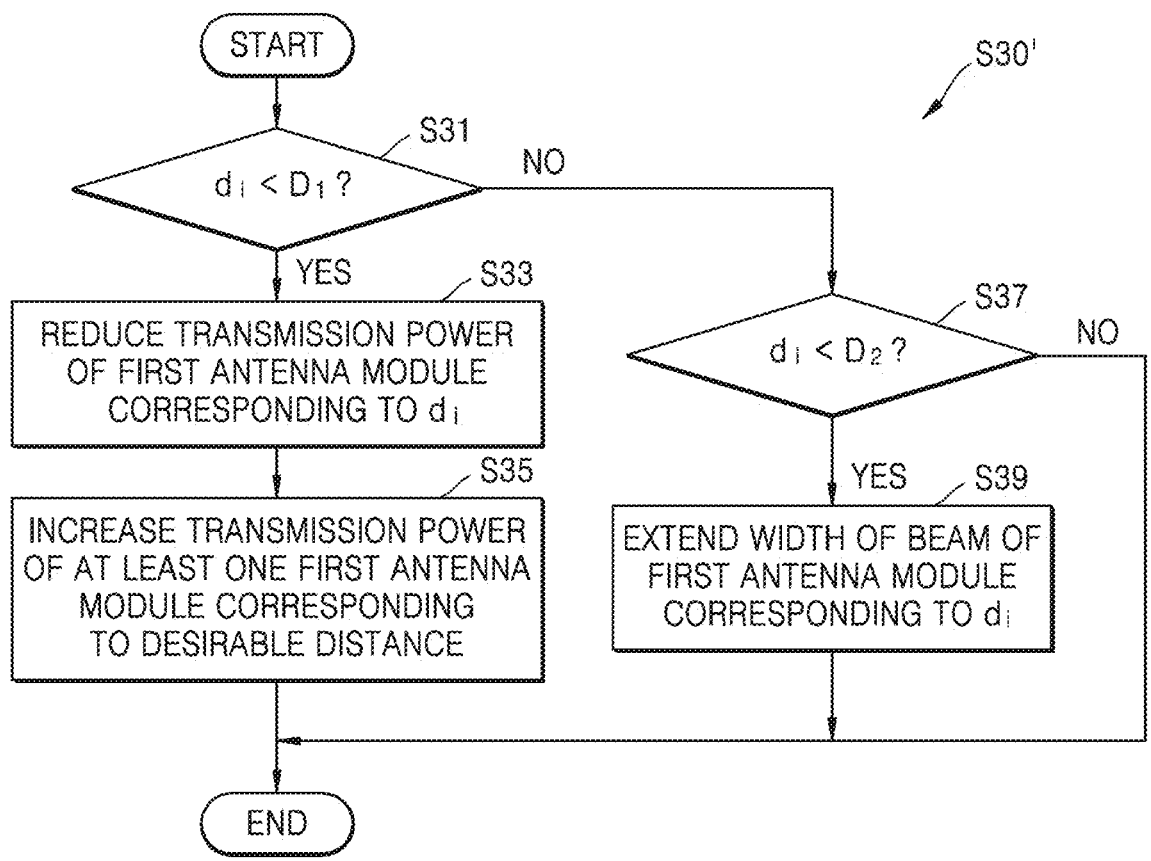
FIG. 9 is a flowchart showing an example of operation S30 of FIG. 3 according to an embodiment of the inventive concepts.

FIG. 9 is a flowchart showing an example of operation S30 of FIG. 3 according to an embodiment of the inventive concepts. As described above with reference to FIG. 3, an operation for controlling transmissions through a plurality of first antenna modules (e.g., 210 of FIG. 2) may be performed in operation S30' of FIG. 9. In detail, FIG. 9 shows a method of controlling transmission through a particular first antenna module of the N first antenna modules based on a distance $d_i$ between the particular first antenna module ($1 \leq i \leq N$) and an external object, and operation S30' of FIG. 9 may be repeated for each of the N first antenna modules. As shown in FIG. 9, operation S30' may include a plurality of operations S31, S33, S35, S37, and S39 and, in some embodiments, operation S30' of FIG. 9 may be performed by the controller 255 of FIG. 2. Hereinafter, FIG. 9 will be described with reference to FIG. 2.

Referring to FIG. 9, in operation S31, an operation for comparing the distance $d_i$ with a first distance $D_1$ may be performed. The first distance $D_1$ may be less than a second distance $D_2$ described below and may have a small value (e.g., 5 mm or 10 mm) to determine a state that an external object is very close to a first antenna module. Thus, when the distance $d_i$ is less than the first distance $D_1$, it may be determined that the external object is very close to the first antenna module. As shown in FIG. 9, when the distance $d_i$ is less than the first distance $D_1$, operation S33 may be performed subsequently. On the other hand, when the distance $d_i$ is not less than the first distance $D_1$, operation S37 may be performed subsequently.

When it is determined in operation S31 that the distance $d_i$ is less than the first distance $D_1$, an operation for reducing the transmission power of a first antenna module corresponding to the distance $d_i$ (e.g., the particular first antenna module) may be performed in operation S33. For example, the controller 255 may determine that the external object is very close to the first antenna module corresponding to the distance $d_i$ based on the distance $d_i$ being less than the first distance $D_1$, and thus, the controller 255 may reduce the transmission power of the corresponding first antenna module or disable the corresponding first antenna module through the control signal C_TX to reduce the energy absorption of electromagnetic waves by the external object.

In operation S35, an operation for increasing the transmission power of at least one first antenna module corresponding to a desirable distance (e.g., a first antenna module different from the first antenna module corresponding to the distance $d_i$) may be performed. For example, the controller 255 may increase the transmission power of at least one first antenna module from among a plurality of first antenna modules through the control signal C_TX, wherein the at least one first antenna module is a desirable distance apart from the external object. The desirable distance may refer to a distance at which no external object is detected or influence on an external object is subtle. In some embodiments, the desirable distance may be defined as a distance greater than the first distance $D_1$ and a second distance $D_2$. Therefore, the transmission power through the first antenna module close to the external object may be reduced in operation S33, while the transmission power through at least one first antenna module far from the external object may be increased in operation S35. Therefore, a user's exposure to electromagnetic waves may be reduced while quality of wireless communication may be maintained.

When it is determined in operation S31 that the distance $d_i$ is not less than the first distance $D_1$, an operation for comparing the distance $d_i$ to the second distance $D_2$ may be performed in operation S37. The second distance $D_2$ may be greater than the first distance $D_1$ and may have a value (e.g., 50 mm or 100 mm) for determining a state that the external object is close to, but not very close to the first antenna module. Therefore, when the distance $d_i$ is less than the second distance $D_2$, the distance $d_i$ may be between the first distance $D_1$ and the second distance $D_2$ and it may be determined that the external object is close to the first antenna module. As shown in FIG. 9, when the distance $d_i$ is less than the second distance $D_2$, operation S39 may be performed subsequently. When the distance $d_i$ is not less than the second distance $D_2$, operation S30' may be repeated with respect to the first antenna module and/or a different first antenna module of the plurality of first antenna modules.

When it is determined in operation S37 that the distance $d_i$ is less than the second distance $D_2$, an operation for extending the width of a beam of a first antenna module corresponding to the distance $d_i$ may be performed in operation S39. For example, the controller 255 may extend the width of a beam formed by the first antenna module corresponding to the distance $d_i$ via the control signal C_TX, and thus, the density of energy absorbed by a user may be reduced. According to some example embodiments, the first distance $D_1$ and/or the second distance $D_2$ may be design parameters determined through empirical study.

Figure 10:
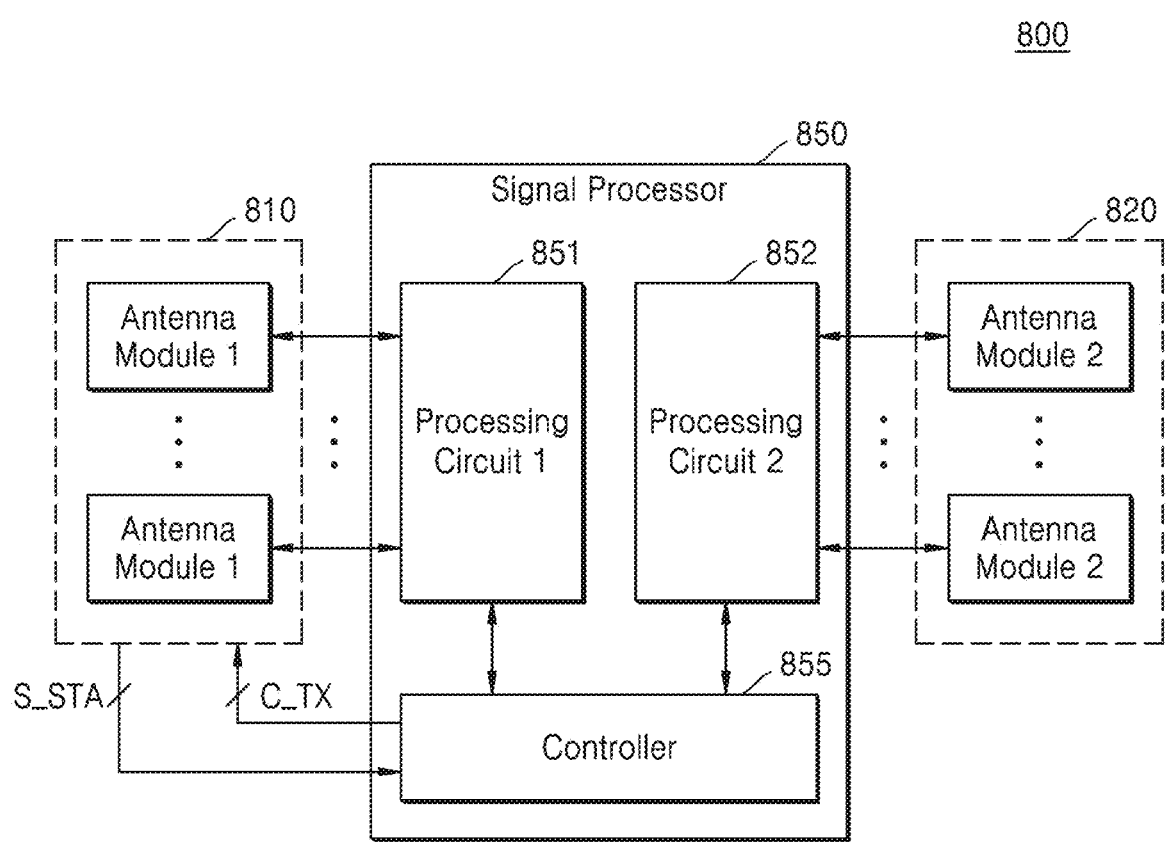
FIG. 10 is a block diagram showing a UE including a controller configured to receive a status signal S_STA, according to an embodiment of the inventive concepts.

FIG. 10 is a block diagram showing a UE 800 according to an embodiment of the inventive concepts. Referring to FIG. 10, the UE 800 may include first antenna modules 810, second antenna modules 820, and/or a signal processor 850, and the signal processor 850 may include a first processing circuit 851, a second processing circuit 852, and/or a controller 855. Hereinafter, descriptions identical or similar to those given above with reference to FIG. 2 will be omitted. According to some example embodiments, operations described herein as being performed by the UE 800, the signal processor 850, the first processing circuit 851, the second processing circuit 852 and/or the controller 855 may be performed by processing circuitry.

The controller 855 may receive a status signal S_STA indicating the states of a plurality of first antenna modules 810 and may generate a control signal C_TX for controlling the transmission power(s) via the first antenna modules 810 based on the status signal S_STA. Although not shown in FIG. 10, in some embodiments, the controller 855 may receive the forward coupling signals S_FC and the reverse coupling signals S_RC of FIG. 2 from a plurality of second antenna modules 820 and generate the control signal C_TX based on the forward coupling signals S_FC and the reverse coupling signals S_RC together with the status signal S_STA.

In some embodiments, as described below with reference to FIGS. 14 and 15, the controller 855 may receive the status signal S_STA that includes information regarding reception powers detected by the first antenna modules 810 and generate the control signal C_TX based on the reception powers of the first antenna modules 810. Also, in some embodiments, as described below with reference to FIGS. 13 and 14, the controller 855 may receive the status signal S_STA that includes information regarding temperatures of the first antenna modules 810 and generate the control signal C_TX based on the temperatures of the first antenna modules 810.

Figure 11:
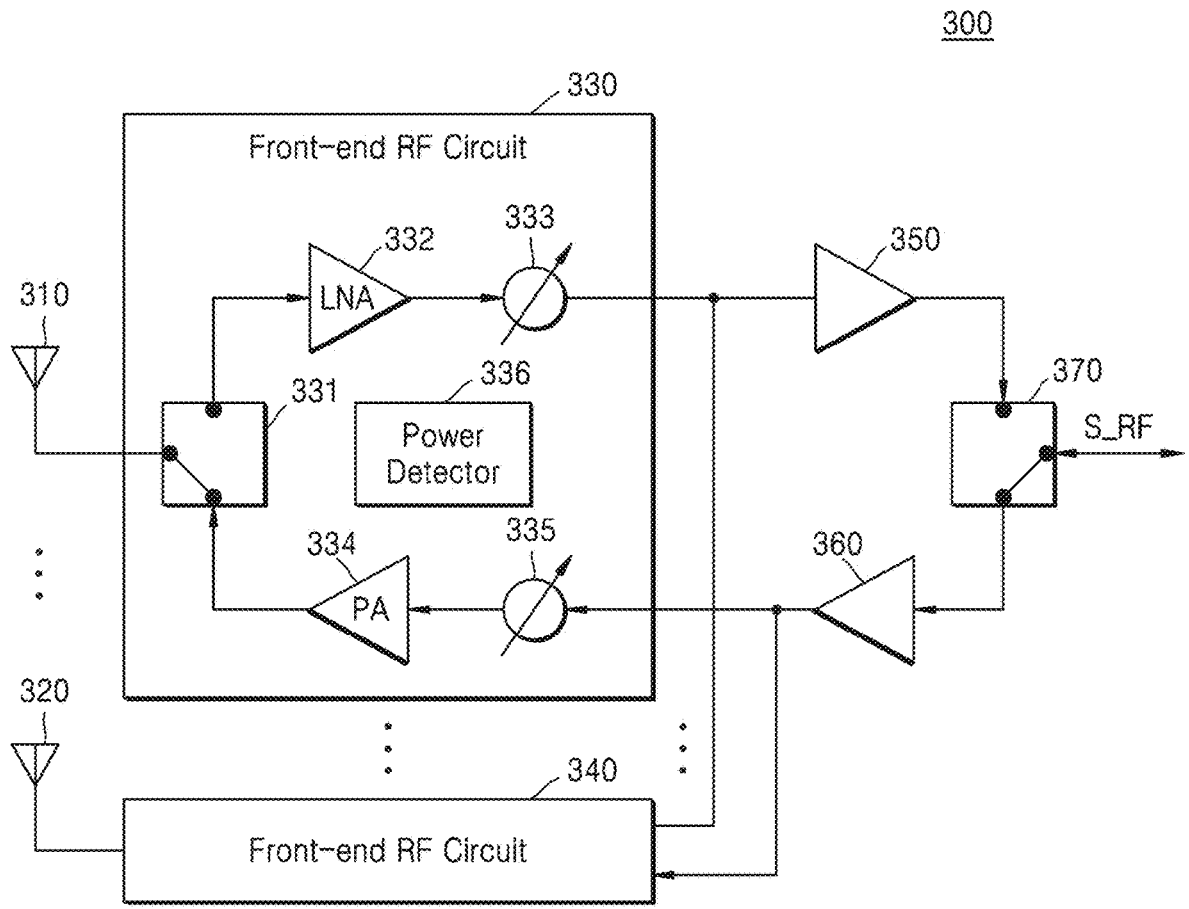
FIG. 11 is a block diagram showing a first antenna module including a power detector, according to an embodiment of the inventive concepts.
Figure 12:
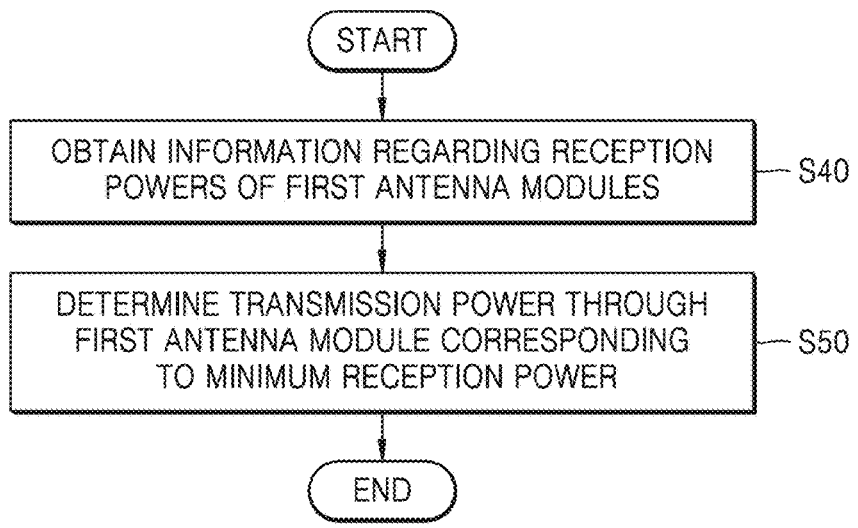
FIG. 12 is a flowchart of a method for controlling exposure to wireless communication by controlling transmission of a plurality of first antenna modules including the first antenna module of FIG. 11, according to an embodiment of the inventive concepts.

FIG. 11 is a block diagram showing a first antenna module 300 according to an embodiment of the inventive concepts, and FIG. 12 is a flowchart of a method of controlling exposure to wireless communication, according to an embodiment of the inventive concepts. In detail, the first antenna module 300 of FIG. 11 may be an example of one of the first antenna modules 810 of FIG. 10, and the method of FIG. 12 is a method of controlling transmissions of a plurality of first antenna modules including the first antenna module 300 of FIG. 11. In some embodiments, the method of FIG. 12 may be performed by the controller 855 of FIG. 10. Hereinafter, FIGS. 11 and 12 will be described with reference to FIG. 10.

Referring to FIG. 11, the first antenna module 300 may include antennas 310 through 320, front-end RF circuits 330 through 340, buffers 350 and 360, and/or a switch 370. The front-end RF circuit 330 may be connected to the antenna 310 and the buffers 350 and 360, and may include a switch 331, a low-noise amplifier (LNA) 332, an RX phase shifter 333, a power amplifier 334, a TX phase shifter 335, and/or a power detector 336 (also referred to herein as a power sensor 336). The switch 331 may connect to the antenna 310 to the low-noise amplifier 332 or the power amplifier 334 according to a reception mode and/or a transmission mode. The low-noise amplifier 332 may amplify a signal received through the switch 331 in the reception mode and provide an amplified signal to the RX phase shifter 333. The RX phase shifter 333 may shift the phase of a signal output from the low-noise amplifier 332 and provide a phase-shifted signal to the RX buffer 350. The TX phase shifter 335 may shift the phase of a signal received from the TX buffer 360 and provide a phase-shifted signal to the power amplifier 334. The power amplifier 334 may amplify a signal received from the TX phase shifter 335 in the transmission mode and provide an amplified signal to the switch 331. The switch 331 may provide a signal output from the power amplifier 334 to the antenna 310 in the transmission mode. The RX buffer 350 may receive signals from the front-end RF circuits 330 through 340 and may provide signals to the switch 370 in the reception mode. The TX buffer 360 may provide signals received from the switch 370 in the transmission mode to the front-end RF circuits 330 through 340. The switch 370 may provide a signal received from the RX buffer 350 in the reception mode as an RF signal S_RF to the outside, e.g., the first processing circuit 851 of FIG. 10, and provide the RF signal S_RF received from the first processing circuit 851 in the transmission mode to the TX buffer 360. According to some example embodiments, each of the front-end RF circuits 330 through 340 may be the same as or similar to the front-end RF circuit 330.

The power detector 336 may detect the power (e.g., a power level) of a signal received via the antenna 310. For example, the power detector 336 may detect the power of a signal traveling through a path including the antenna 310, the switch 331, the low-noise amplifier 332, and the RX phase shifter 333 in a reception mode. According to some example embodiments, the power detector 336 may include a voltage sensor and/or a current sensor. The front-end RF circuits 330 through 340 may each include a power detector (the same as or similar to the power detector 336), and the power detector may provide status signals S_STA of FIG. 10 including information regarding detected reception powers to the controller 855 (e.g., through a connection, such as a wired connection, to the controller 855, not shown). In some embodiments, information regarding all of the transmission powers detected by the front-end RF circuits 330 through 340 may be provided to the controller 855 through the status signal S_STA, and values calculated (e.g., by a data processor 780 discussed in association with FIG. 16) from the transmission powers detected by the front-end RF circuits 330 through 340, e.g., an average, may be provided to the controller 855 through the status signal S_STA as transmission power detected by the first antenna module 300. According to some example embodiments, operations described herein as being performed by the power detector 336 may be performed by processing circuitry. According to some example embodiments, the first antenna module 300 may have a different number of antennas and corresponding front-end RF circuits than depicted in FIG. 11.

Referring to FIG. 12, in operation S40, an operation for obtaining information regarding reception powers of the first antenna modules 810 may be performed. For example, the controller 855 of FIG. 10 may receive the status signal S_STA including information regarding the reception powers detected by power detectors included in the first antenna modules 810 as described above with reference to FIG. 11.

In operation S50, an operation for determining transmission power through a first antenna module corresponding to the lowest or low reception power may be performed. When reception power detected by a particular first antenna module from among the first antenna module 810 is significantly lower than those detected by the other first antenna modules, it may be estimated that an external object is located close to the first antenna module by which the low reception power is detected. Therefore, the controller 855 may determine whether to reduce the transmission power of the first antenna module corresponding to the lowest reception power from among the reception powers obtained in operation S40 and to increase the transmission powers of first antenna modules corresponding to desirable reception powers. Accordingly, a user's exposure to electromagnetic waves may be reduced while maintaining the quality of wireless communication. An example of operation S50 will be described below with reference to FIG. 13.

Figure 13:
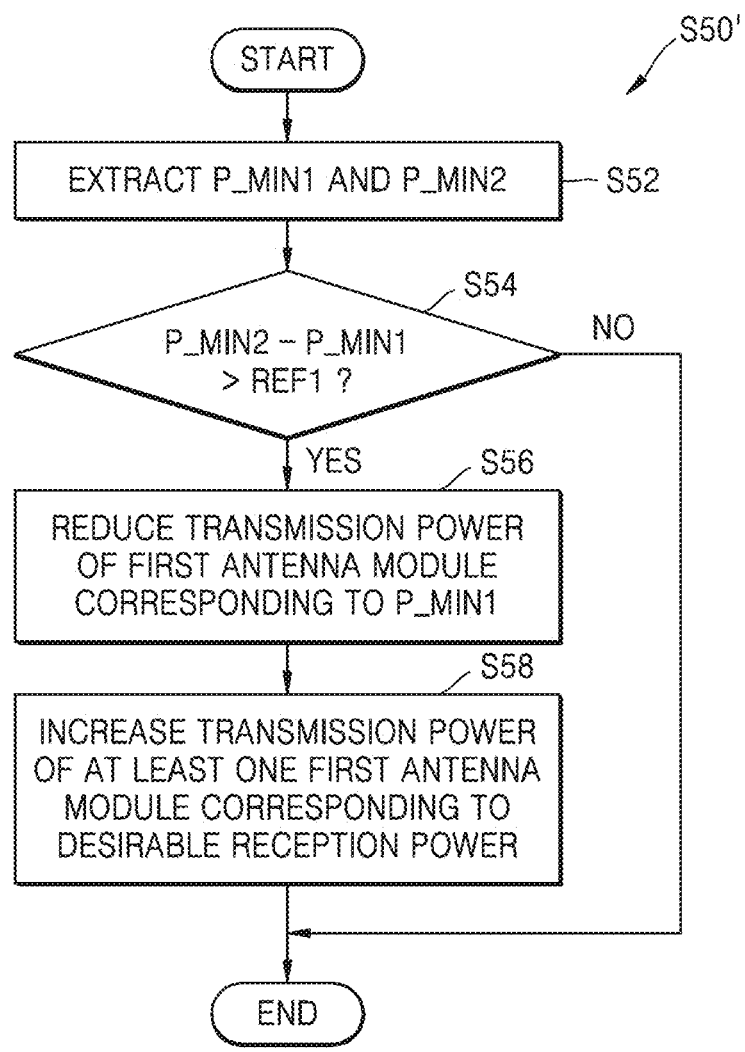
FIG. 13 is a flowchart showing an example of operation S50 of FIG. 12 according to an embodiment of the inventive concepts.

FIG. 13 is a flowchart showing an example of operation S50 of FIG. 12 according to an embodiment of the inventive concepts. As described above with reference to FIG. 12, in operation S50' of FIG. 13, an operation for determining the transmission power through the first antenna module corresponding to the lowest reception power may be performed. As shown in FIG. 13, operation S50' may include a plurality of operations S52, S54, S56, and S58 and, in some embodiments, operation S50' of FIG. 13 may be performed by the controller 855 of FIG. 10. Hereinafter, FIG. 13 will be described with reference to FIG. 10.

In operation S52, an operation for extracting a first minimum power P_MIN1 (e.g., a first minimum power level) and a second minimum power P_MIN2 (e.g., a second minimum power level) may be performed. The first minimum power P_MIN1 may correspond to the lowest one of the reception powers of the first antenna modules 810 (e.g., a lowest power level) and the second minimum power P_MIN2 may correspond to the second lowest one of the reception powers of the first antenna modules 810 (e.g., a second lowest power level). In other words, the first minimum power P_MIN1 and the second minimum power P_MIN2 may be extracted as shown in Equation 2 below.

$$P\_MIN1 = \min\{P\_RX_i | 1 \leq i \leq N\}$$

$$P\_MIN2 = \min\{P\_RX_i | 1 \leq i \leq N, P\_RX_i \neq P\_MIN1\} \quad [\text{Equation 2}]$$

In Equation 2, $P\_RX_i$ may denote reception power detected by one of the N first antenna modules.

In operation S54, an operation for comparing a difference between the first minimum power P_MIN1 and the second minimum power P_MIN2 with a first reference value REF1 (e.g., determining whether the difference between the first minimum power P_MIN1 and the second minimum power P_MIN2 is greater than the first reference value REF1) may be performed. Since the second minimum power P_MIN2 is equal to or greater than the first minimum power P_MIN1, as shown in FIG. 13, when a value P_MIN2−P_MIN1 obtained by subtracting the first minimum power P_MIN1 from the second minimum power P_MIN2 is greater than the first reference value REF1, which is a positive value, operation S56 may be performed subsequently. Otherwise, operation S50' may be terminated.

In operation S56, an operation for reducing the transmission power of a first antenna module corresponding to the first minimum power P_MIN1 may be performed. In other words, when the difference between the first minimum power P_MIN1 and the second minimum power P_MIN2 is greater than the first reference value REF1, the controller 855 may determine that an external object is close to the first antenna module corresponding to the first minimum power P_MIN1, and thus, the controller 855 may reduce the transmission power of the corresponding first antenna module through the control signal C_TX. According to some example embodiments, the first reference value REF1 may be a design parameter determined through empirical study.

In operation S58, an operation for increasing the transmission power of at least one first antenna module corresponding to desirable reception power may be performed. Desirable reception power may indicate that a signal arrives at the first antenna module from a wireless communication device (e.g., 10 in FIG. 1) of another user without an obstacle. In some embodiments, the desirable reception power may be determined (e.g., by the controller 855 and/or a data processor 780 discussed in association with FIG. 16) based on statistical characteristics of reception powers detected by a plurality of first antenna modules and may be defined as an average of reception powers of the first antenna modules or a value increased by a multiple of the standard deviation from the average.

Figure 14:
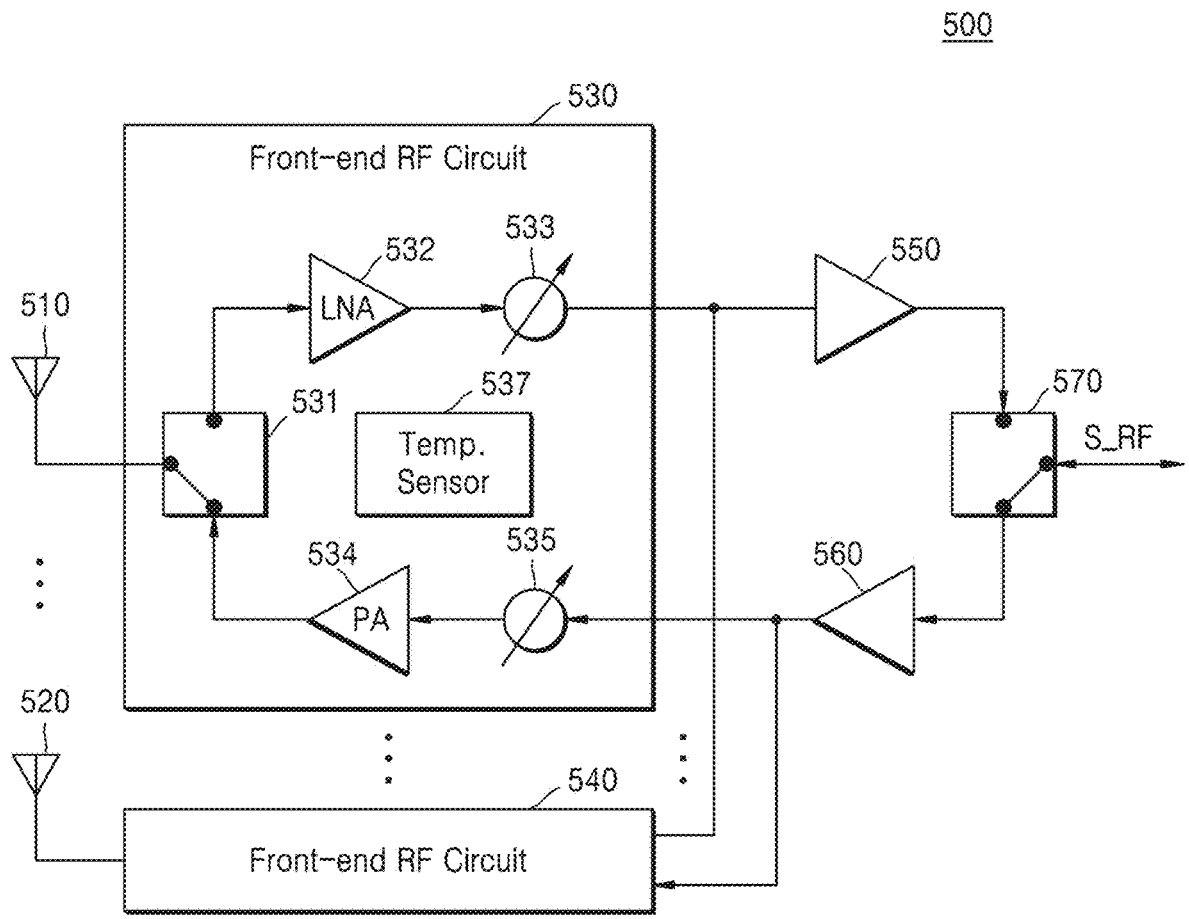
FIG. 14 is a block diagram showing a first antenna module including a temperature sensor, according to an embodiment of the inventive concepts.
Figure 15:
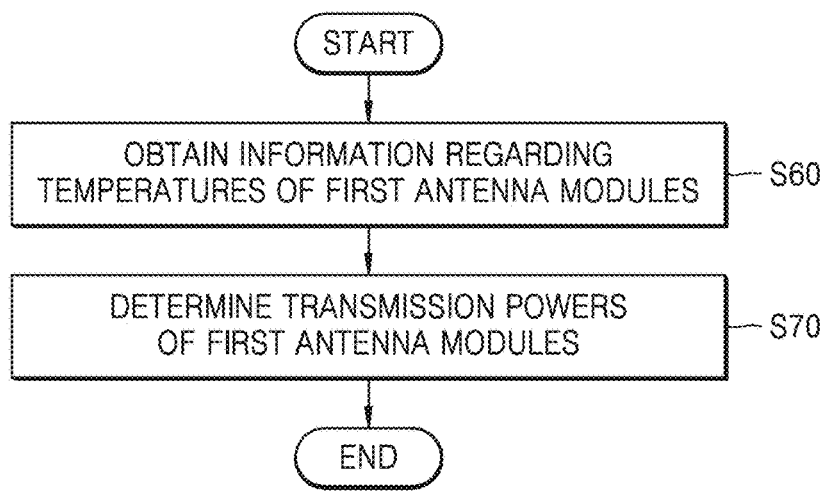
FIG. 15 is a flowchart of a method for controlling exposure to wireless communication by controlling transmission of a plurality of first antenna modules including the first antenna module of FIG. 14, according to an embodiment of the inventive concepts.

FIG. 14 is a block diagram showing a first antenna module 500 according to an embodiment of the inventive concepts, and FIG. 15 is a flowchart of a method of controlling exposure to wireless communication, according to an embodiment of the inventive concepts. In detail, the first antenna module 500 of FIG. 14 may be an example of one of the first antenna modules 810 of FIG. 10, and the method of FIG. 15 is a method of controlling transmissions of a plurality of first antenna modules including the first antenna module 500 of FIG. 14. In some embodiments, the method of FIG. 15 may be performed by the controller 855 of FIG. 10. Hereinafter, FIGS. 14 and 15 will be described with reference to FIG. 10. Hereinafter, descriptions identical or similar to those given above with reference to FIG. 11 will be omitted.

Referring to FIG. 14, the first antenna module 500 may include antennas 510 through 520, front-end RF circuits 530 through 540, buffers 550 and 560, and/or a switch 570. The front-end RF circuit 530 may include a switch 531, a low-noise amplifier 532, an RX phase shifter 533, a power amplifier 534, a TX phase shifter 535, and/or a temperature sensor 537. The temperature sensor 537 may detect the temperature of the front-end RF circuit 530. For example, the front-end RF circuits 530 through 540 may each include a temperature sensor (e.g., the same as or similar to the temperature sensor 537), and temperature sensors may provide the status signals S_STA of FIG. 10 including information regarding the detected temperatures to the controller 855 (e.g., through a connection, such as a wired connection, to the controller 855, not shown). In some embodiments, information regarding all of the temperatures detected by the front-end RF circuits 530 through 540 may be provided to the controller 855 through the status signal S_STA, and values calculated (e.g., by a data processor 780 discussed in association with FIG. 16) from the temperatures detected by the front-end RF circuits 530 through 540, e.g., an average, may be provided to the controller 855 through the status signal S_STA as a temperature detected by the first antenna module 500. According to some example embodiments, each of the front-end RF circuits 530 through 540 may be the same as or similar to the front-end RF circuit 530. According to some example embodiments, operations described herein as being performed by the temperature sensor 537 may be performed by processing circuitry. According to some example embodiments, the first antenna module 500 may have a different number of antennas and corresponding front-end RF circuits than depicted in FIG. 14.

Referring to FIG. 15, in operation S60, an operation for obtaining information regarding temperatures of the first antenna modules 810 may be performed. For example, the controller 855 of FIG. 10 may receive the status signal S_STA including information regarding the temperatures detected by temperature sensors included in the first antenna modules 810 as described above with reference to FIG. 14.

In operation S70, an operation for determining transmission powers through a plurality of first antenna modules may be performed. In the case of increasing transmission power through a first antenna module, elements included in the first antenna module, e.g., the power amplifier 534 of FIG. 14, may emit heat due to increased power consumption. A temperature rise of the first antenna module may cause malfunction of the elements included in the first antenna module (e.g., the low-noise amplifier 532, the RX phase shifter 533, the power amplifier 534 and/or the TX phase shifter 535) and may also cause a temperature rise of the UE 800. Therefore, the controller 855 may reduce the transmission power through a first antenna module at which a temperature equal to higher than a second reference value is detected from among a plurality of first antenna modules. For example, in operation S35 of FIG. 9 and operation S58 of FIG. 13, the transmission power of some of a plurality of first antenna modules may be increased. However, when the temperature of the corresponding first antenna modules become higher than the second reference value due to the increase of the transmission powers, the transmission powers through the corresponding first antenna modules may be reduced again. According to some example embodiments, the second reference value may be a design parameter determined through empirical study.

Figure 16:
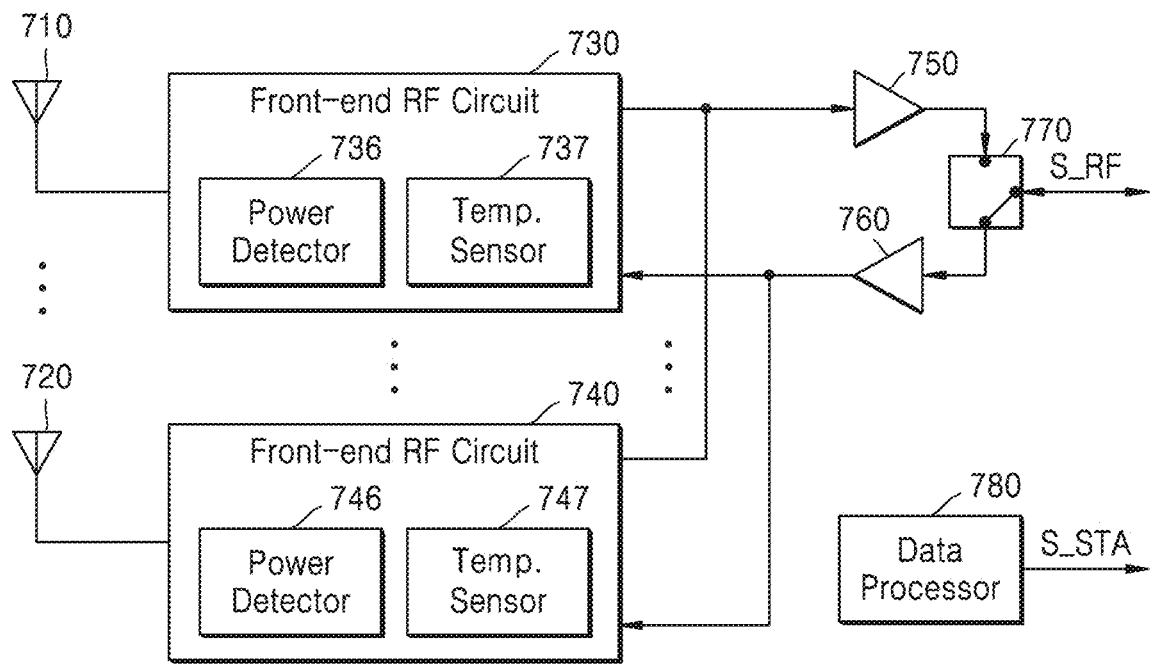
FIG. 16 is a block diagram showing a first antenna module including a data processor, according to an embodiment of the inventive concepts.

FIG. 16 is a block diagram showing a first antenna module 700 according to an embodiment of the inventive concepts. In detail, the first antenna module 700 of FIG. 16 may be an example of one of the first antenna modules 810 of FIG. 10. Hereinafter, descriptions identical or similar to those given above with reference to FIGS. 11 and 14 will be omitted.

As shown in FIG. 16, the first antenna module 700 may include antennas 710 through 720, front-end RF circuits 730 through 740, buffers 750 and 760, a switch 770, and/or a data processor 780. A front-end RF circuit 730 may include a power detector 736 and/or a temperature sensor 737. Similarly, a front-end RF circuit 740 may include a power detector 746 and/or a temperature sensor 747. According to some example embodiments, each of the front-end RF circuits 730 through 740 may be the same as or similar to the front-end RF circuit 730. According to some example embodiments, operations described herein as being performed by the data processor 780, the power detector 736, the power detector 746, the temperature sensor 737 and/or the temperature sensor 747 may be performed by processing circuitry. According to some example embodiments, the first antenna module 700 may have a different number of antennas and corresponding front-end RF circuits than depicted in FIG. 16.

The data processor 780 may receive signals output by power detectors 736 and/or 746, and/or temperature sensors 737 and/or 747, of the front-end RF circuits 730 through 740 included in the first antenna module 700 and may generate a status signal S_STA by processing the received signals. For example, the data processor 780 may calculate an average, a maximum or highest value, and a minimum or lowest value of reception powers provided from the power detectors 736 and/or 746 and generate the status signal S_STA including calculated values as information regarding the reception power of the first antenna module 700. Also, the data processor 780 may calculate an average, a maximum or highest value, and a minimum or lowest value of temperatures provided from the temperature sensors 737 and/or 747 and generate the status signal S_STA including calculated values as information regarding the temperature of the first antenna module 700. According to some example embodiments, the data processor 780 may transmit the status signal S_STA to the controller 855 through a connection (e.g., a wired connection, not shown). In some embodiments, unlike as shown in FIG. 16, the front-end RF circuits 730 through 740 may each include either a power detector or a temperature sensor only.

Figure 17:
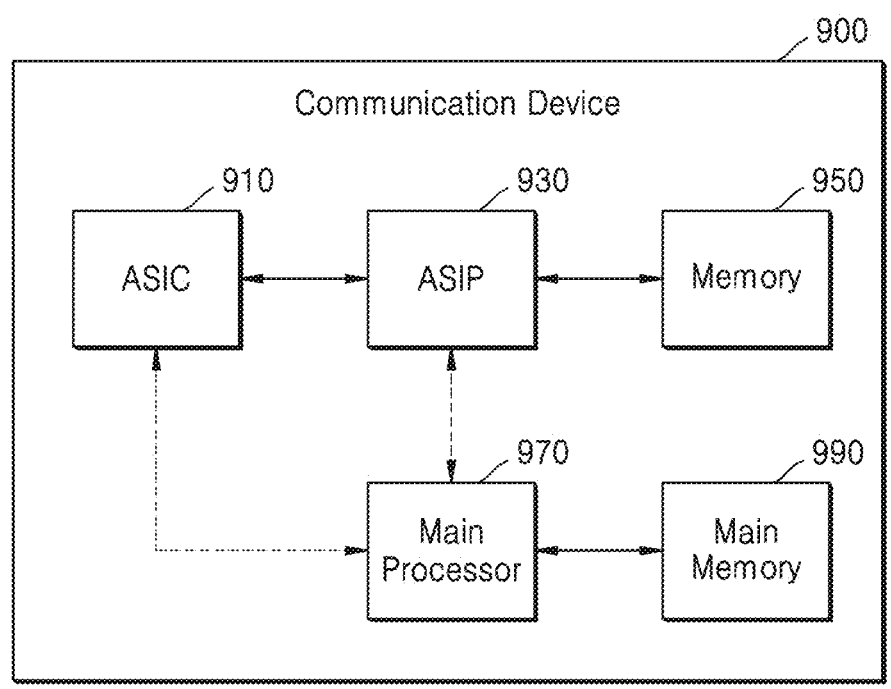
FIG. 17 is a block diagram showing a communication device according to an embodiment of the inventive concepts.

FIG. 17 is a block diagram showing a communication device 900 according to an embodiment of the inventive concepts. In some embodiments, the communication device 900 may be included in the UE 100 of FIG. 1 and may perform the operations of the controller 155.

As shown in FIG. 17, the communication device 900 may include an application specific integrated circuit (ASIC) 910, an application specific instruction set processor (ASIP) 930, a memory 950, a main processor 970, and/or a main memory 990. Two or more of the ASIC 910, the ASIP 930, and/or the main processor 970 may communicate with each other (one another). Also, at least two of the ASIC 910, the ASIP 930, the memory 950, the main processor 970, and/or the main memory 990 may be embedded in one chip.

The ASIP 930 may be an integrated circuit customized for a particular purpose, may support a dedicated instruction set for a particular application, and execute instructions included in the instruction set. The memory 950 may communicate with the ASIP 930 and may be a non-volatile storage device that stores a plurality of instructions to be executed by the ASIP 930. For example, the memory 950 may include any type of memory accessible by the ASIP 930, which may be, but is not limited to, a random access memory (RAM), a read only memory (ROM), a tape, a magnetic disk, an optical disk, a volatile memory, a non-volatile memory, and a combination thereof.

The main processor 970 may control the communication device 900 by executing a plurality of instructions. For example, the main processor 970 may control the ASIC 910 and/or the ASIP 930, process data received via a wireless communication network, and/or process an user input regarding the communication device 900. The main memory 990 may communicate with the main processor 970 and may be a non-volatile storage device that stores a plurality of instructions to be executed by the main processor 970. For example, the main memory 990 may include any type of memory accessible by the main processor 970, which may be, but is not limited to, a random access memory (RAM), a read only memory (ROM), a tape, a magnetic disk, an optical disk, a volatile memory, a non-volatile memory, and a combination thereof.

A method of controlling exposure to wireless communication may be performed by at least one of the components included in the communication device 900 of FIG. 17. In some embodiments, the operations of the controller 155 of FIG. 1 may be implemented as a plurality of instructions stored in the memory 950, and the ASIP 930 may perform at least one of operations of the method of controlling exposure to wireless communication by executing the instructions stored in the memory 950. In some embodiments, at least one of operations of the method of controlling exposure to wireless communication may be performed by a hardware block designed through logic synthesis or the like, and such a hardware block may be included in the ASIC 910. In some embodiments, at least one of the operations of the method of controlling exposure to wireless communication may be implemented as a plurality of instructions stored in the main memory 990, and the main processor 970 may perform at least one of operations of the method of controlling exposure to wireless communication by executing the instructions stored in the main memory 990.

Conventional wireless communication devices using high frequency electromagnetic waves, such as millimeter waves, incorporate additional components (e.g., a distance sensor, a gyro sensor, a touch sensor, etc.) to determine when a user is proximate to the wireless communication device, and reduce transmission power of the wireless communication device in response to such a determination. Such conventional wireless communication devices involve excessive costs and waste limited physical space by incorporating the additional components. Also, the quality of wireless communication in the conventional wireless communication devices is excessively reduced when the transmission power of the wireless communication device is reduced.

However, some example embodiments provide improved wireless communication devices capable of determining when the user is proximate to the wireless communication device without incorporating additional components. Accordingly, the improved wireless communication devices may be less costly and/or less wasteful of limited physical space (e.g., more space efficient). Also, the improved wireless communication devices are able to reduce the transmission power of an antenna module and increase the transmission power of a different antenna module when the user is determined to be proximate to the antenna module. Thus, the improved wireless communication devices may reduce the user's exposure to high frequency electromagnetic waves while maintaining the quality of wireless communication.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts has been particularly shown and described with reference to embodiments thereof, it will be understood that various changes in form and details may be made therein without departing from the spirit and scope of the following claims.

What is claimed is:

1. A signal processing apparatus comprising:
   processing circuitry configured to:
   determine a relative position of a body part of a user with respect to a user equipment based on a characteristic of a signal received from a first antenna module; and
   change a characteristic of a beam transmitted from a second antenna module based on the relative position of the body part, wherein
   the first antenna module is configured for wireless communication in a first frequency band,
   the second antenna module is configured for wireless communication in a second frequency band, and
   the first frequency band is different from the second frequency band.

2. The signal processing apparatus of claim 1, wherein the second frequency band is a higher frequency band than the first frequency band.

3. The signal processing apparatus of claim 1, wherein
   the first antenna module is configured for an LTE system, and
   the second antenna module is configured for a 5G system.

4. The signal processing apparatus of claim 1, wherein the characteristic of the beam comprises a beam pattern or a transmission power.

5. The signal processing apparatus of claim 1, wherein the characteristic of the signal comprises a reflection coefficient.

6. The signal processing apparatus of claim 1, wherein the processing circuitry is further configured to obtain the relative position by using an artificial neural network trained using a plurality of reference characteristics.

7. A terminal capable of connecting to multiple wireless communication systems, the terminal comprising:
   a plurality of first antenna modules configured to connect to a first wireless communication system using a first frequency band;
   a plurality of second antenna modules configured to connect to a second wireless communication system using a second frequency band, the second frequency band being a lower frequency band than the first frequency band; and
   processing circuitry configured to,
   calculate a plurality of calculated reflection coefficients of the plurality of second antenna modules,
   obtain a plurality of distances between an external object and the plurality of first antenna modules based on the plurality of calculated reflection coefficients, and
   control transmission through the plurality of first antenna modules based on the plurality of obtained distances.

8. The terminal of claim 7, further comprising:
   a look-up table including a plurality of combinations of reference reflection coefficients in association with a plurality of reference distances,
   wherein the processing circuitry is further configured to,
   obtain the plurality of obtained distances based on the plurality of calculated reflection coefficients by referencing the look-up table.

9. The terminal of claim 7, wherein
   each respective second antenna module among the plurality of second antenna modules includes a respective antenna and a respective coupler coupled to the respective antenna; and
   the processing circuitry is further configured to,
   receive a forward coupling signal and a reverse coupling signal from a particular coupler of a particular second antenna module among the plurality of second antenna modules, and
   calculate a reflection coefficient among the plurality of calculated reflection coefficients based on the forward coupling signal and the reverse coupling signal.

10. The terminal of claim 7, wherein
    each respective first antenna module among the plurality of first antenna modules includes a respective antenna and a respective power sensor, the respective power sensor being configured to detect a respective power level of a signal received via the respective antenna; and
    the processing circuitry is further configured to control transmission through the plurality of first antenna modules based on a plurality of power levels detected at the plurality of first antenna modules.

11. The terminal of claim 10, wherein the processing circuitry is further configured to reduce transmission power output through a low-power first antenna module among the plurality of first antenna modules based on a difference between a lowest power level and a second lowest power level being greater than a first reference value, the plurality of power levels including the lowest power level and the second lowest power level, and the low-power first antenna module corresponding to the lowest power level.

12. The terminal of claim 7, wherein
each respective first antenna module among the plurality of first antenna modules includes a respective temperature sensor configured to sense a respective temperature; and
the processing circuitry is further configured to reduce transmission power output through a high-temperature first antenna module among the plurality of first antenna modules at which a temperature equal to or higher than a second reference value is sensed.

13. The terminal of claim 7, wherein the first frequency band is a millimeter wave (mmWave) band.

14. The terminal of claim 7, wherein each respective first antenna module among the plurality of first antenna modules comprises:
a respective patch antenna on a front surface of the terminal; and
a respective dipole antenna on a side surface of the terminal.

15. The terminal of claim 7, wherein each respective second antenna module among the plurality of second antenna modules comprises:
a respective primary antenna at one end of the terminal; and
a respective diversity antenna at another end of the terminal.

16. The terminal of claim 7, wherein the processing circuitry is further configured to obtain the plurality of distances by using an artificial neural network trained using a plurality of reference reflection coefficients.

17. A signal processing apparatus for controlling exposure to wireless communication, the signal processing apparatus comprising:
a look-up table including a plurality of combinations of reference reflection coefficients in association with a plurality of reference distances; and
processing circuitry configured to,
calculate a plurality of reflection coefficients of a plurality of first antenna modules,
obtain a plurality of distances based on the plurality of calculated reflection coefficients by referencing the look-up table, the plurality of obtained distances being distances to an external object from a plurality of second antenna modules, and
control transmission through the plurality of second antenna modules based on the plurality of obtained distances,
wherein
the plurality of first antenna modules are configured for wireless communication in a first frequency band,
the plurality of second antenna modules are configured for wireless communication in a second frequency band, and
the first frequency band is a lower frequency band than the second frequency band.

18. The signal processing apparatus of claim 17, wherein the processing circuitry is further configured to reduce transmission power output through a particular second antenna module among the plurality of second antenna modules corresponding to a particular distance among the plurality of obtained distances, the particular distance being less than a first distance.

19. The signal processing apparatus of claim 17, wherein each respective second antenna module among the plurality of second antenna modules includes a respective antenna and a respective power sensor, the respective power sensor being configured to detect a power level of a signal received via the respective antenna; and
the processing circuitry is further configured to control transmission through the plurality of second antenna modules based on a plurality of power levels detected at the plurality of second antenna modules.

20. The signal processing apparatus of claim 17, wherein each respective second antenna module among the plurality of second antenna modules includes a temperature sensor configured to sense a temperature; and
the processing circuitry is further configured to reduce transmission power output through the respective second antenna module based on the temperature being equal to or higher than a second reference value.

* * * * *